US 8,628,844 B2

(12) United States Patent
Catalfamo

(10) Patent No.: US 8,628,844 B2
(45) Date of Patent: Jan. 14, 2014

(54) WATER-SOLUBLE SUBSTRATE WITH RESISTANCE TO DISSOLUTION PRIOR TO BEING IMMERSED IN WATER

(75) Inventor: Vincenzo Catalfamo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1922 days.

(21) Appl. No.: 11/824,703

(22) Filed: Jul. 2, 2007

(65) Prior Publication Data

US 2008/0008872 A1    Jan. 10, 2008

Related U.S. Application Data

(60) Provisional application No. 60/818,696, filed on Jul. 5, 2006.

(51) Int. Cl.
*B32B 5/16* (2006.01)
*B32B 17/10* (2006.01)
*B32B 7/04* (2006.01)

(52) U.S. Cl.
USPC ........... 428/323; 428/324; 428/327; 428/339; 428/341

(58) Field of Classification Search
USPC .................. 428/323, 324, 327, 339, 341
See application file for complete search history.

(56) References Cited

U.S. PATENT DOCUMENTS

| 2005/0009972 A1* | 1/2005 | Rauh et al. ............ 524/284 |
| 2005/0065051 A1* | 3/2005 | Catlin et al. .......... 510/220 |
| 2006/0221451 A1* | 10/2006 | Ohishi et al. ......... 359/599 |
| 2008/0108748 A1* | 5/2008 | Buckley et al. ....... 524/612 |

FOREIGN PATENT DOCUMENTS

| EP | 0 079 248 A2 | 5/1983 |
| JP | 51-138772 | 11/1976 |
| JP | 01-029438 | 1/1987 |
| JP | 2534313 B2 | 9/1996 |
| JP | 2001162708 | * 6/2001 |
| WO | WO 2008/004201 A2 | 1/2008 |

OTHER PUBLICATIONS

Machine translation of JP2001-162708 (2001).*
English Translation of JP 2001-162708 (2001).*
http://plastics.ides.com/datasheet/e117223/kuraray-poval-pva-117 (2012).*
International Search Report mailed Feb. 3, 2009—5 pages.

* cited by examiner

*Primary Examiner* — Callie Shosho
*Assistant Examiner* — Samir Shah
(74) *Attorney, Agent, or Firm* — Abbey A. Lopez

(57) ABSTRACT

A water-soluble substrate, and more particularly a water-soluble substrate that is resistant to contact with small amounts of water, and methods of making the same are disclosed. A coating which is less water-soluble than the water-soluble substrate and in the form of particles, is applied to and substantially covers at least one surface of the water-soluble substrate. The weight ratio of coating to water-soluble substrate is higher than 0.8. Articles, such as pouches, made from the water-soluble substrate, are also disclosed herein.

12 Claims, 2 Drawing Sheets

US 8,628,844 B2

WATER-SOLUBLE SUBSTRATE WITH RESISTANCE TO DISSOLUTION PRIOR TO BEING IMMERSED IN WATER

CROSS REFERENCE TO RELATED APPLICATION

This application claims the benefit U.S. Provisional Application Ser. No. 60/818,696, filed Jul. 5, 2006, the disclosure of which is incorporated by reference.

FIELD OF THE INVENTION

This invention relates to a water-soluble substrate, and more particularly a water-soluble substrate which has improved resistance to dissolution prior to being immersed in water, and methods of making the same. This invention also relates to articles, such as pouches, made from the water-soluble substrate.

BACKGROUND OF THE INVENTION

Water-soluble substrates are gaining wider acceptance for use as packaging materials. Packaging materials include films, sheets, blown or molded hollow bodies (i.e. sachets, pouches, and tablets), bottles, receptacles and the like. Often, water-soluble substrates, when used in the preparation of certain types of these articles such as sachets and pouches, leak and/or become sticky when exposed to small amounts of water or high humidity. This can make them unsuitable for usage in the packaging and storage of the compositions contained therein.

The most common consumer complaint for water-soluble pouches is linked to unwanted pouch dissolution when accidentally exposed to small amounts of water, such as when water gets inside the outer packaging in which the pouches are sold and stored after purchase, from wet hands, high humidity, leaking sinks or pipes during storage. This may cause the water-soluble pouches to leak prior to use and/or stick together. The second most frequent complaint is that of the water-soluble pouch failing to fully dissolve upon use. Thus, there remains an unmet need for water-soluble substrates and articles made therefrom, such as sachets and pouches, which have improved resistance to dissolution against exposure to small amounts of water, yet can dissolve very quickly when immersed in an aqueous solution, such as rinse and/or wash water.

There is also a tendency to reduce the thickness of the water-soluble substrates not only to improve the dissolution in use, but also to manufacture water-soluble substrates and articles made therefrom at lower cost. However, as water-soluble substrates become thinner, their resistance to dissolution decreases.

Various methods are known in the art to retard the dissolution of water-soluble substrates. Typically, these methods involve coating the water-soluble substrate with a water-insoluble material. U.S. Pat. No. 6,509,072 describes a water-soluble substrate comprising a barrier coating. The barrier coating is a polymeric film which forms a continuous film on the water-soluble substrate. Another example of a barrier coating is described in WO 01/23460, assigned to Kao Corporation, wherein a surface of the water-soluble substrate is coated with a particulate or fibrous water-insoluble material wherein the amount of the water-insoluble material used is 0.1-80 parts per 100 parts by weight of the water-soluble film. These barrier coatings of the prior art are applied at a low amount and are relatively thin with respect to the thickness of the water-soluble substrate. These coatings may however not be sufficient to provide said substrate with sufficient resistance to dissolution after exposure to accidental water contact. This is especially the case when thin water-soluble substrates are to be used.

It is therefore an aspect of the present invention to provide a water-soluble substrate having improved resistance to dissolution prior to being immersed in water, independent of the thickness of the water-soluble substrate, yet can subsequently dissolve very quickly when immersed in an aqueous solution, such as rinse and/or wash water.

SUMMARY OF THE INVENTION

The present invention relates to a water-soluble substrate comprising a first surface, a second surface opposite to said first surface, and a thickness between said first and second surfaces, said water-soluble substrate having a coating applied to, and substantially covering, at least one of said first and second surfaces, characterized in that the weight ratio of coating to water-soluble substrate is higher than 0.80.

The present invention also relates to an articles comprising the water-soluble substrate, and to a method of making the water-soluble substrate.

DETAILED DESCRIPTION OF THE INVENTION

This invention relates to a water-soluble substrate, and more particularly a water-soluble substrate which has improved resistance to dissolution prior to being immersed in water, and methods of making the same. This invention also relates to articles comprising the water-soluble substrate described herein.

Water-Soluble Substrate

Figure 1:
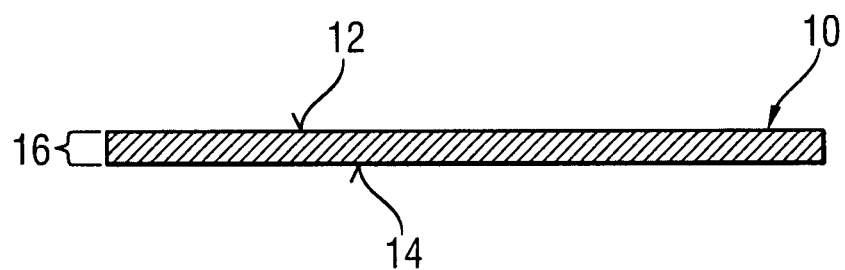
FIG. 1 shows a cross-section of a non-coated water-soluble substrate.

FIG. 1 shows a cross-section of a water-soluble substrate 10. The water-soluble substrate 10 has a first surface 12, a second surface 14 opposite to the first surface 12, and a thickness 16 between the first surface 12 and the second surface 14. The water-soluble substrate 10 can be in the form of a film, a sheet, or a foam, and includes woven and non-woven structures.

The water-soluble substrate is made of polymeric materials and has a water-solubility of at least 50 weight %, as measured by the method set out here after using a glass-filter with a maximum pore size of 20 microns. Preferably, the water-solubility of the substrate is at least 75 weight % or even more preferably at least 95 weight %.

50 grams±0.1 gram of substrate material is added in a pre-weighed 400 ml beaker and 245 ml±1 ml of 25° C. distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved fraction). Then, the % solubility can be calculated.

Typically the water-soluble substrate 10 has a basis weight of from 0.33 to 1,667 grams per square meter, preferably from 33 to 167 grams per square meter. The thickness of the water-soluble substrate 10 between the first surface 12 and the second surface 14 can range from about 0.75 micrometer to about 1,250 micrometer, preferably from about 10 micrometer to about 250 micrometer, more preferably from about 25 micrometer to about 125 micrometer.

Preferred polymers, copolymers or derivatives thereof suitable for use as substrate material are selected from polyvinyl alcohol (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohol copolymers, hydroxypropyl methyl cellulose (HPMC), and mixtures thereof. The most preferred polymer is polyvinyl alcohol. Preferably, the level of polymer in the substrate is at least 60%.

An example of commercially available water-soluble films are PVA films known under the trade reference Monosol M8630, as sold by MonoSol LLC of Gary, Ind., US, and PVA films of corresponding solubility and deformability characteristics. Other films suitable for use herein include films known under the trade reference PT film or the K-series of films supplied by Aicello, or VF-HP film supplied by Kuraray.

Coating

A coating is applied to and substantially covers at least one of the first or second surfaces 12, 14 of the water-soluble substrate 10. The coating can be water soluble. However it is not as water soluble as the water-soluble substrate 10. Preferably, the water solubility of the coating is less than 75 weight % as measured according to the previously described method. With "substantially covers", it is meant that at least 95%, preferably at least 99%, and most preferably 100% of the first or second surface 12, 14 is covered by the coating. This ensures that upon accidental water-contact, the water will either not be able to reach the first or second surface 12, 14 of the water-soluble substrate 10, or the amount of water that reaches said surface, is not enough to completely dissolve the water-soluble substrate 10.

The coating is applied at a weight ratio of coating to water-soluble substrate of more than 0.80 (i.e. the ratio of weight of coating:weight of water-soluble substrate). Preferably, the weight ratio of coating to water-soluble substrate is at least 0.85, more preferably at least 0.90, even more preferably at least 1.00 and can be as high as 100, preferably up to 50, more preferably up to 20, even more preferably up to 10. Such amounts of coating allow a thinner water-soluble substrate 10 to be used which has sufficient resistance to dissolution upon accidental water contact, without negatively impacting the solubility when the coated substrate is immersed in water. Most preferred ranges for the weight ratio of coating to water-soluble substrate are between 0.80 and 10, more preferably from 0.85 to 5, even more preferably from 0.90 to 3, even more preferably from 1 to 2.

Without being bound by theory, it is believed that the resistance to dissolution does not depend solely on the thickness or on the solubility of the water-soluble substrate 10, nor solely on the thickness, solubility or coverage of the coating. Instead, the overall resistance of the combined substrate, that is the water-soluble substrate 10 with the coating applied to it and the time for the water to reach the water soluble substrate 10 through the available pathways created by the coating, is what matters. As such, if the thickness of the water-soluble substrate 10 is low, the weight ratio of coating to water-soluble substrate 10 needs to be high in order to render the coated substrate sufficient resistant to dissolution.

The coating can comprise a variety of materials, and can be applied in a variety of forms and methods, which will now be explained.

In another preferred embodiment, the coating 20 is water-insoluble. With "water-insoluble", it is meant that the solubility is less than 50 weight % as measured according to the previously described method. Preferably the coating has a water-solubility of less than 40 weight %, more preferably less than 30 weight %, and most preferably less than 10 weight %. The water-insoluble material may be a water-insoluble inorganic material or a water-insoluble organic material.

The water-insoluble inorganic material may be zeolite, bentonite, talc, mica, kaolin, sepiolite, silica, calcium carbonate, titanium oxide, anhydrous silicic acid, hydroxy calcium apatite, phthalocyanine blue, Helindone Pink, Hansa Orange, pearlescent material, etc., while zeolite, bentonite, talc, mica, kaolin, silica, titanium oxide, silicone, etc. are preferred.

The water-insoluble organic material may be a natural polymer selected from cellulose and/or its derivatives, starch and/or their derivatives, seed hulls and/or their derivatives. Cellulose and/or its derivatives and starch are preferred.

Figure 3:
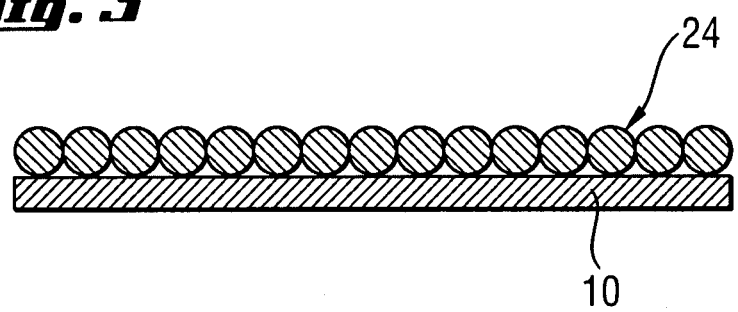
FIG. 3 shows a cross-section of another embodiment of a water-soluble substrate according to the present invention.

FIG. 3 shows an embodiment of the water-soluble substrate 10, wherein the coating 20 is in the form of particles 24. These particles have an average diameter of 500 micrometers or less, more preferably 300 micrometers or less, even more preferably from 0.01 to 300 micrometers. In a highly preferred embodiment, the particles 24 are in the nanosize-range, with average particle diameters of from 0.01 to 1 micrometer. Coating the water-soluble substrate 10 with nano-sized particles further provides the benefit that the coating becomes transparent, which is aesthetically preferred.

Preferably, the coating 20 is flexible. When converting the water-soluble substrate 10 through a line for printing, sheeting, slitting, rewinding and other typical converting operations, or when making articles such as pouches, comprising the water-soluble substrate 10, the water-soluble substrate 10 is typically stretched. In certain areas of the substrate 10, the substrate 10 may be elongated even up to 200% or more. This can cause the coating to break, and thus allow water to contact the surface of the water-soluble substrate 10. It is thus preferred that the coating 20 is flexible, and can be stretched without breaking. Preferably, the coating 20 can be elongated at least 20%, more preferably at least 30%, even more preferably at least 50%, most preferably more than 100% and up to 200%, without breaking. Examples of such a flexible coating are liquid polyurethane coatings sold by Ideal Products LLC (Plymouth, Ind.) under the tradename of Sani-Tred Permaflex™, or by HMG America LLC (Performance Coatings, Roebuck, S.C.) under the tradename Flexithane™. Other examples of flexible coatings are the acrylic-based dip coatings which are flexible at low temperatures, sold by JC Whitney Inc. (Chicago, Ill.). A mixture of these coatings with any of the previously described coatings may also be used.

The coating according to the present invention can be opaque, but is preferably transparent or translucent. Also preferred are colored or three-dimensional coatings in order to create appealing effects such as tactile (touch) effects or visual effects, such as graphics, cartoons, logo's, branding, user's instructions, and the like.

When the water-soluble substrate according to the present invention is however immersed in water (i.e. in applications for which the substrate is designed to be used and required to dissolve), the coating is not sufficient to resist the water contact and ensures that the substrate dissolves rapidly.

Figure 2:
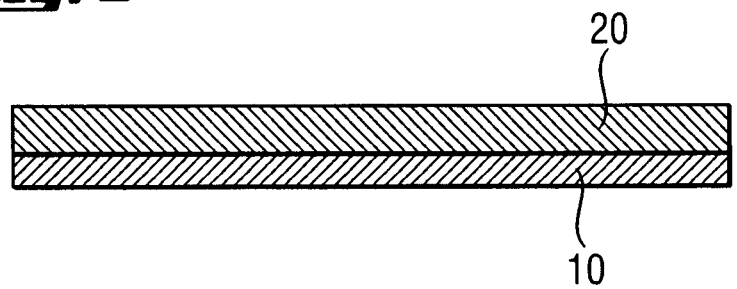
FIG. 2 shows a cross-section of one embodiment of a water-soluble substrate according to the present invention.

In one preferred embodiment as shown in FIG. 2, the coating 20 further comprises a composition comprising PVA having a high hydrolysis degree. The hydrolysis degree of the PVA used for the coating is preferably greater than 97%. When PVA is used in the water-soluble substrate, the PVA used in the coating preferably has a higher hydrolysis degree. The PVA can be a mixture of PVA with other water-soluble polymers, such as those described above.

Optional Ingredients

It may be required for certain applications that the dissolution rate (when immersed) of the substrate is increased. Disintegrants may be added to the coating in order to speed up the dissolution when the water-soluble substrate 10 is immersed in water. Where present, the level of disintegrant in the coating is from 0.1 to 30%, preferably from 1 to 15%, by weight of said coating. Alternatively, disintegrants may also be applied on the surface of the water-soluble substrate 10, opposite to the surface onto which the coating is applied, or they may be applied onto both surfaces of the water-soluble substrate 10, or they may be integrated into the water-soluble film 10, or any combination thereof. Any suitable disintegrant can be used. Preferred disintegrants for use herein are corn/potato starch, methyl cellulose/celluloses, mineral clay powders, croscarmelose (cross-linked cellulose), crospovidine (cross-linked polymer), sodium starch glycolate (cross-linked starch).

The water-soluble substrate-forming composition and the water-soluble substrate 10 formed there from, can also comprise one or more additive or adjunct ingredients. For example, the water-soluble substrate-forming composition and the water-soluble substrate 10 may contain: plasticizers, lubricants, release agents, fillers, extenders, anti-blocking agents, de-tackifying agents, antifoams, or other functional ingredients. The latter may, in the case of articles containing compositions for washing, include functional detergent additives to be delivered to the wash water, for example organic polymeric dispersants, or other detergent additives.

Suitable plasticizers include, but are not limited to: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof. The plasticizer can be incorporated in the water-soluble substrate 10 in any suitable amount including amounts in the range of from about 5% to about 30% by weight, or in the range of from about 12% to about 20% by weight.

Suitable surfactants may include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). The surfactant can be incorporated in the water-soluble substrate 10 in any suitable amount including amounts in the range of from about 0.01% to about 1% by weight, or in the range of from about 0.1% to about 0.6% by weight.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble substrate 10 in any suitable amount including amounts within the range of from about 0.02% to about 1.5% by weight, or in the range of from about 0.04% to about 0.15% by weight.

Suitable fillers, extenders, antiblocking agents, detackifying agents include, but are not limited to: starches, modified starches, crosslinked polyvinylpyrrolidone, crosslinked cellulose, microcrystalline cellulose, silica, metallic oxides, calcium carbonate, talc and mica. The filler, extender, antiblocking agent, detackifying agent can be present in the water-soluble substrate 10 in any suitable amount including amounts in the range of from about 0.1% to about 25% by weight, preferably in the range of from about 1% to about 15% by weight. In the absence of starch, it may be desirable for the filler, extender, antiblocking agent, detackifying agent to be present in a range of from about 1% to about 5% by weight.

Suitable antifoams include, but are not limited to, those based on polydimethylsiloxanes and hydrocarbon blends. The antifoam can be present in the water-soluble substrate 10 in any suitable amount including amounts in the range of from about 0.001% to about 0.5%, preferably in the range of from about 0.01% to about 0.1% by weight.

Benefit agents may also be incorporated into the coating. As such, it is possible to deliver benefit agents via articles such as pouches, which are not compatible with the product or composition inside the article. Examples of benefit agents which can be incorporated inside the hollow glass beads, or applied to the outside surface of glass beads include, but are not limited thereto, cleaning agents, soil suspending agents, anti-redeposition agents, optical brighteners, bleaches, enzymes, perfume compositions, bleach activators and precursors, shining agents, suds suppressor agents, fabric caring compositions, surface nurturing compositions. For example, when the coating is created by applying multiple layers of a coating material, benefit agents may be applied inbetween coating layers.

The water-soluble substrate-forming composition is prepared by mixing the materials and agitating the mixture while raising the temperature from about 70° F. (about 21° C.) to 195° F. (about 90° C.) until solution is complete. The substrate-forming composition may be made into any suitable form (e.g. film or sheets) and may then be subsequently formed into any suitable product (e.g. single- and multiple-compartment pouches, sachets, bags, etc.).

Methods of Making a Water-Soluble Substrate

There are numerous non-limiting embodiments of the method of making the water-soluble substrate 10 described herein.

In one embodiment, the method comprises providing a previously formed water-soluble substrate 10 and applying a coating 20 to at least one of the surfaces 12, 14 of the previously formed water-soluble substrate 10.

The coating 20 can be applied to the previously formed water-soluble substrate 10 in a number of different manners. In one non-limiting embodiment, the coating 20 is applied to at least one of the surfaces 12, 14 of the previously formed water-soluble substrate 10 in the form of particles or a powder. Preferably, the particles or the powder are applied to the water-soluble substrate 10 via a jet, or electro-statically. Due to the high speed of the jet, some of the particles or powder is embedded into the substrate, thereby reducing, or even eliminating the need for using a binder. Also when the particles are applied electro-statically, a binder is generally not needed.

Nevertheless, a binder may be used. The binder may first be applied to the water-soluble substrate 10, before the particles is applied. Or, alternatively, the binder may be mixed with the particles, and then the mixture is added to the water-soluble substrate 10.

In another non-limiting embodiment of the method, the coating 20 is provided in the form of a solution that is applied onto at least one of the surfaces 12, 14 of the water-soluble substrate 10, and is allowed to dry, or undergoes a drying process. The solution can be applied on the film by means of any coating process, including spray, knife, rod, kiss, slot, painting, printing and mixtures thereof. Printing is preferred for use herein. Printing is a well established and economic process. Printing is usually done with inks and dyes and used to impart patterns and colours to substrates but in the case of the invention, printing is used to deposit the less water-soluble material onto a water-soluble substrate. Any kind of printing method can be used, including rotogravure, lithography, flexography, porous and screen printing, inkjet printing, letterpress, tampography and combinations thereof.

These embodiments may also comprise a step of wetting at least a portion of at least one of the surfaces 12, 14 of the water-soluble substrate 10 prior to applying the coating 20 to the previously formed water-soluble substrate 10. The wetting of at least one of the surfaces 12, 14 of the water-soluble substrate 10 may be used to at least partially dissolve or solubilize an outer portion of the surface 12, 14 of the substrate 10 (that is, part of the way into the thickness of the substrate). The water-soluble substrate 10 may be at least partially solubilized to any suitable depth in order to partially embed the coating into the substrate. Suitable depths include, but are not limited to: from about 1% to about 40% or about 45%, from about 1% to about 30%, from about 1% to about 20%, from about 1% to about 15%, and alternatively, from about 1% to about 10% of the overall substrate thickness 16. The coating 20 is then applied to the partially dissolved portion of at least one of the surfaces 12, 14 of the substrate 10. This allows the coating 20 to be embedded into an outer portion of the surface 12, 14 of the substrate 10, and to become a more permanent part of the substrate 10. The wetted surface 12, 14 of the substrate 10 with the coating 20 embedded into the same is then permitted to dry. Such an embodiment of the method may also comprise a step of removing at least some of any loose or excess coating 20 remaining on the surface of the water-soluble substrate 10 after it has dried, such as by wiping or dusting the surface of the substrate 10.

In another embodiment, the coating 20 can be added to the water-soluble substrate 10 after the substrate 10 is made into a product. For example, if the water-soluble substrate 10 is used to form a water-soluble pouch that contains a composition, the coating 20 can be added to the substrate 10 on at least a portion of the surface of the water-soluble pouch.

In another non-limiting embodiment of the method, the coating 20 is applied in multiple application steps. A first coating layer is applied to the water-soluble substrate 10 according to any of the above methods, and is optionally allowed to dry. Subsequently, one or more additional coating layers may be added until the desired coating thickness is obtained, and are optionally allowed to dry. As such, relatively thick coatings can be created on thin water-soluble substrates.

In another non-limiting embodiment of the method, a coating layer may be formed separately, after which it is applied to a surface of the water-soluble substrate.

Methods of Making a Water-Soluble Pouch

The water-soluble substrate 10 described herein can be formed into articles, including but not limited to those in which the water-soluble substrate 10 is used as a packaging material. Such articles include, but are not limited to water-soluble pouches, sachets, and other containers.

Water-soluble pouches and other such containers that incorporate the water-soluble substrate 10 described herein can be made in any suitable manner known in the art. The water-soluble substrate 10 can be provided with improved resistance to solubility either before or after forming the same into the final product. In either case, in certain embodiments it is desirable when making such articles, that the surface 12, 14 of the substrate 10 onto which the coating is applied, forms an outer surface of the article.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a substrate. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a substrate is placed in the die and open pouches are formed in these molds, which can then be filled, covered with another layer of substrate, and sealed. In the third process (formation of pouches in molds on the surface of a circular drum), a substrate is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the substrate can initially be molded or formed into the shape of an open pouch using thermoforming, vacuum-forming, or both. Thermoforming involves heating the molds and/or the substrate by applying heat in any known way such as contacting the molds with a heating element, or by blowing hot air or using heating lamps to heat the molds and/or the substrate. In the case of vacuum-forming, vacuum assistance is employed to help drive the substrate into the mold. In other embodiments, the two techniques can be combined to form pouches, for example, the substrate can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or substrate, such as a water-soluble substrate, over and onto the web of open pouches and then sealing the first substrate and second substrate together. The second material or substrate can comprise the water-soluble substrate 10 described herein. It may be desirable for the surface of the second substrate onto which the coating is applied, to be oriented so that it forms an outer surface of the pouch.

In such a process, the first and second substrates are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al.

Articles of Manufacture

Figure 4:
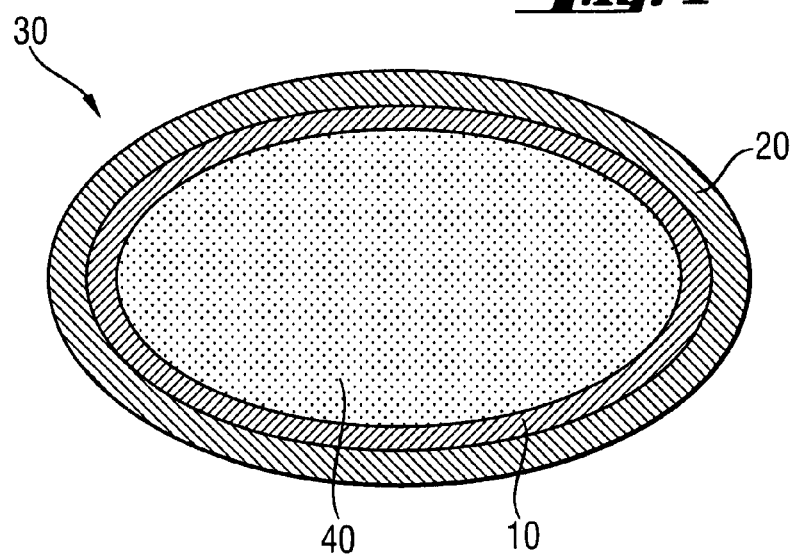
FIG. 4 shows a cross-section of an article comprising a water-soluble substrate according to the present invention.

As shown in FIG. 4, the present invention also includes articles comprising a product composition 40 and a water-soluble substrate 10 which may be formed into a container 30, such as a pouch, a sachet, a capsule, a bag, etc. to hold the product composition. The surface of the water-soluble substrate 10 which has the coating 20 applied thereto, may be used to form an outside surface of the container 30. The water-soluble substrate 10 may form at least a portion of a container 30 that provides a unit dose of the product composition 40.

For simplicity, the articles of interest herein will be described in terms of water-soluble pouches, although it should be understood that discussion herein also applies to other types of containers.

The pouches 30 formed by the foregoing methods, can be of any form and shape which is suitable to hold the composition 40 contained therein, until it is desired to release the composition 40 from the water-soluble pouch 30, such as by immersion of the water-soluble pouch 30 in water. The pouches 30 can comprise one compartment, or two or more compartments (that is, the pouches can be multi-compartment pouches). In one embodiment, the water-soluble pouch 30 may have two or more compartments that are in a generally superposed relationship and the pouch 30 comprises upper and lower generally opposing outer walls, skirt-like side walls, forming the sides of the pouch 30, and one or more internal partitioning walls, separating different compartments from one another. If the composition 40 contained in the pouches 30 comprises different forms or components, the different components of the composition 40 may be contained in different compartments of the water-soluble pouch 30 and may be separated from one another by a barrier of water-soluble material.

The pouches or other containers 30 may contain a unit dose of one or more compositions 40 for use as/in laundry detergent compositions, automatic dishwashing detergent compositions, hard surface cleaners, stain removers, fabric enhancers and/or fabric softeners, food and beverage and new product forms where contact with small amounts of water could create premature pouch dissolution, unwanted pouch leakage and/or undesirable pouch-to-pouch stickiness. The composition 40 in the pouches 30 can be in any suitable form including, but not limited to: liquids, liquigels, gels, pastes, creams, solids, granules, powders, etc. The different compartments of multi-compartment pouches 30 may be used to separate incompatible ingredients. For example, it may be desirable to separate bleaches and enzymes into separate compartments. Other forms of multi-compartment embodiments may include a powder-containing compartment in combination with a liquid-containing compartment. Additional examples of multiple compartment water-soluble pouches are disclosed in U.S. Pat. No. 6,670,314 B2, Smith, et al.

The water-soluble pouches 30 may be dropped into any suitable aqueous solution (such as hot or cold water), whereupon water-soluble substrate 10 forming the water-soluble pouches 30 dissolves to release the contents of the pouches.

The water-soluble substrate 10 described herein can also be used for coating products and other articles. Non-limiting examples of such a product are laundry detergent tablets or automatic dishwashing detergent tablets. Other examples include coating products in the food and beverage category where contact with small amounts of water could create premature dissolution, unwanted leakage and/or undesirable stickiness.

EXAMPLES

In order to assess the resistance of a water-soluble substrate against accidental water contact, a film of PVA is created on a water-soluble substrate, such as a cellulosic-based (paper) substrate from Dissolvo LLC (Croydon, Pa.), sold under the tradename of basic grade D60S. The film is made by coating the paper substrate with an aqueous solution containing 4% PVA, after which it is dried. The resulting PVA film has a basis weight of about 0.44 gsm, and a thickness of about 0.33 micrometer.

A first PVA film (A), as made according to the above procedure, is used as comparative example.

A second (B) and third (C) PVA film, as made according to the above procedure, are further coated with a coating, in order to produce a water-soluble substrate according to the present invention. An aqueous suspension of micronised PTFE particles, commercially available from EIC under EC 007003, is applied to the surface of the PVA film (opposite to the surface which contacts the paper substrate). The coating of sample B has a basis weight of 15.90 gsm, and the coating of sample C has a basis weight of 30.16 gsm resulting in a ratio of less water-soluble material to water-soluble substrate of 36 and 68 respectively.

Figure 5:
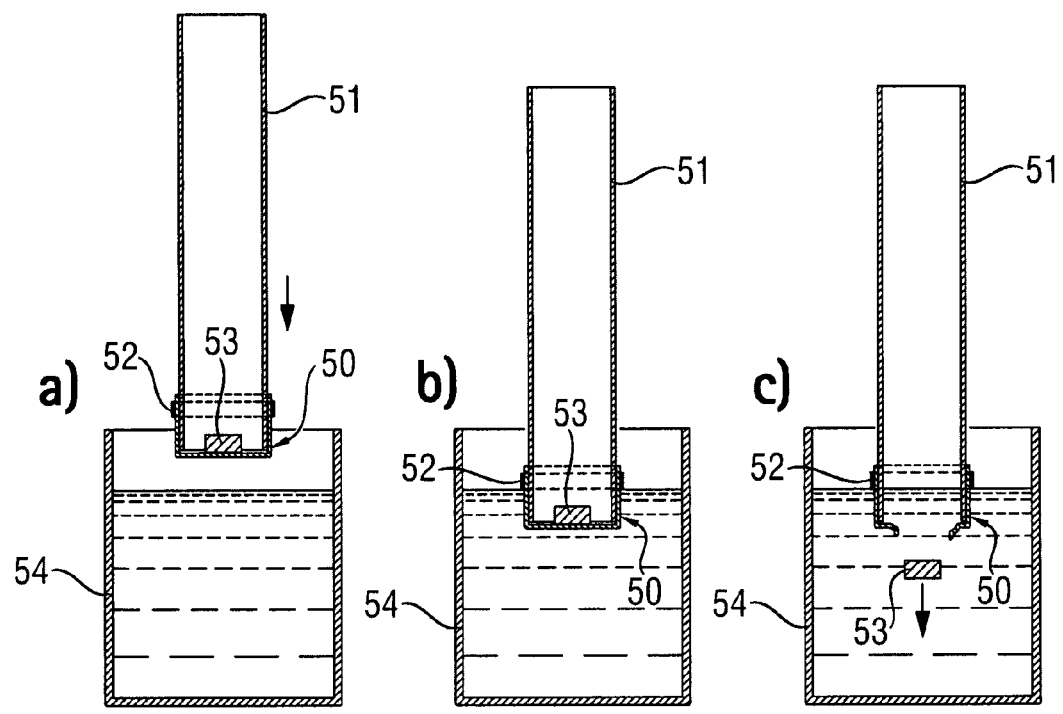
FIG. 5 shows a schematic representation of a test method.

As shown in FIG. 5, each sample 50 is attached on one open end of a 2" hollow plastic 51 tube and fixed with a rubber band 52. A 2 gram weight 53 is placed on the inside of the tube. The tube, with the sample facing downwards, is lowered 1" into a beaker 54 of room temperature (20-25° C.) water. The time is recorded from when the paper hits the water level to when the weight drops through the sample. This time is recorded as the "time to break". The higher the time to break, the higher is the resistance of the sample against water.

For comparison, a paper substrate alone (D) is also tested. Results:

| Sample | Time to break (seconds) |
|--------|-------------------------|
| A      | 1                       |
| B      | 9                       |
| C      | 11                      |
| D      | 1                       |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A water-soluble substrate comprising a first surface, a second surface opposite to said first surface, and a thickness between said first and second surfaces, said water-soluble substrate having a coating applied to, and substantially covering, at least one of said first or second surfaces, wherein the weight ratio of coating to water-soluble substrate is from about 10 to about 50, and wherein said coating is in the form of particles selected from water-insoluble inorganic material or water-insoluble organic material and wherein said coating further comprises poly vinyl alcohol having a hydrolysis degree of at least about 97%.

2. The water-soluble substrate according to claim 1, wherein said thickness between said first and second surfaces is from about 0.75 micrometer to about 1,250 micrometer.

3. The water-soluble substrate according to claim 1, wherein said particles comprise a water-insoluble organic material that is a natural polymer.

4. The water-soluble substrate according to claim 1, wherein said particles have an average diameter of about 500 micrometers or less.

5. The water-soluble substrate according to claim 1, wherein said particles have an average diameter of from about 0.01 to about 1 micrometer.

6. The water-soluble substrate according claim 1, wherein said coating further comprises a flexible material which can be elongated by at least about 20%.

7. The water-soluble substrate according to claim 1, wherein said coating is applied to, and substantially covers both first and second surfaces.

8. The water-soluble substrate according to claim 1, wherein said coating is transparent or translucent.

9. The water-soluble substrate according to claim 1, wherein said coating is colored or three-dimensional, and comprises graphics, cartoons, logo's, branding, user's instructions or any combination thereof.

10. The water-soluble substrate according to claim 1, wherein said coating further comprises a disintegrant.

11. An article comprising the water-soluble substrate according to claim 1, wherein at least one of said first and second surfaces having said coating applied thereto, forms an outside surface of said article.

12. The article according to claim 11 wherein said water-soluble substrate forms at least a portion of a container that comprises a product composition.

* * * * *